United States Patent Office 2,745,851
Patented May 15, 1956

2,745,851

OXIDATION OF PROGESTERONE AND PRODUCTS PRODUCED THEREBY

Aram Mooradian, Nassau, N. Y., assignor to Sterling Drug Inc., New York, N. Y., a corporation of Delaware No Drawing. Application October 25, 1951,
Serial No. 253,195

6 Claims. (Cl. 260—397.47)

This invention relates to a process for the oxidation of progesterone with from two to four moles of lead tetraacetate and to new chemical compounds obtained thereby. These new substances are useful for their adrenal cortical hormone properties, and as intermediates for the preparation of other steroid hormones.

The process is carried out by heating progesterone with from two to four moles of lead tetraacetate in acetic acid solution at a temperature between about 70° C. and 150° C. A preferred temperature lies in the range between about 85° C. and about 120° C. Lower temperatures can be employed provided a sufficient time is allowed for the reaction to proceed to completion. Temperatures higher than about 120° C. require the application of pressure to increase the boiling point of the mixture. The time required for the reaction varies inversely with the temperature, and the completion of the reaction is readily confirmed by testing a drop of the mixture with potassium iodide solution in order to detect the presence of unreacted lead tetraacetate which readily oxidizes potassium iodide to free iodine.

The product of this reaction is complex, containing various acetoxylated progesterones as well as a compound of the invention, 21-acetoxy-$\Delta^{1,4}$-pregnadiene-3,20-dione. The quantity of lead tetraacetate used relative to the amount of progesterone is critical. If less than two moles or more than four moles of lead tetraacetate is used, the 21-acetoxy-$\Delta^{1,4}$-pregnadiene-3,20-dione is not produced in detectable quantities.

The components of the reaction mixture are crystalline substances, but their separation from the mixture by ordinary fractional crystallization methods proves very tedious and inefficient and fails completely to isolate 21-acetoxy-$\Delta^{1,4}$-pregnadiene-3,20-dione which can only be accomplished by chromatography. This process comprises passing a solution of the reaction mixture through a column of suitable adsorbent, such as silica gel, alumina or charcoal. The different components are adsorbed to varying extents on the column and can be selectively eluted with organic solvents. In this way, 21-acetoxy-$\Delta^{1,4}$-pregnadiene-3,20-dione can be separated from the reaction mixture in relatively pure form. Further purification is readily accomplished by simple recrystallization.

21-acetoxy-$\Delta^{1,4}$-pregnadiene-3,20-dione can be saponified to the 21-hydroxy compound, $\Delta^{1,4}$-pregnadiene-3,20-dion-21-ol. The saponification conditions must be mild because the 1,4-diene structure is sensitive and is readily altered by the action of chemical reagents. Satisfactorily mild saponification conditions comprise heating the 21-acetoxy compound with potassium bicarbonate in methanol solution, although even here some by-products are formed, and the 21-hydroxy compound is best purified by chromatography.

$\Delta^{1,4}$-pregnadiene-3,20-dion-21-ol can be readily esterified to a 21-acyloxy-$\Delta^{1,4}$-pregnadiene-3,20-dione by well-known methods for converting steroid alcohols to their carboxylic acid esters.

The following examples will further illustrate my invention.

*Example 1*

A solution of 20.0 g. (0.0636 mole) of progesterone in 100 ml. of acetic acid was poured into a solution of 102 g. of 84.5% lead tetraacetate (0.195 mole) in 1100 ml. of acetic acid at 65° C. The resulting mixture was refluxed at about 120° C. for three hours. At this time a test showed that all the lead tetraacetate had been consumed. This test consisted of touching a drop of the mixture to a piece of moist potassium iodide paper and watching for the formation of a free iodine color due to the oxidizing power of any remaining lead tetraacetate.

The reaction mixture was then cooled and poured into four liters of water. The aqueous mixture was extracted twice with ether and the ether extracts washed four times with water, four times with 8% sodium bicarbonate solution, and twice with water. The ether solution was then dried over anhydrous sodium sulfate. The ether was evaporated and the viscous oily residue was dissolved in a minimum amount of a mixture of equal volumes of ether and low-boiling petroleum ether (Skellysolve A) and passed through a column, 8 cm. in diameter, packed with 1000 g. of silica gel of less than 200 mesh. The column was eluted with ether-petroleum ether mixtures of increasing ether content as follows:

Fraction:

1, 50% ether—50% pet. ether_____ 8000 ml.
2, 50% ether—50% pet. ether_____ 4000 ml.
3, 60% ether—40% pet. ether_____ 2000 ml.
4, 70% ether—30% pet. ether_____ 6000 ml.
5, 70% ether—30% pet. ether_____ 2000 ml.
6, 70% ether—30% pet. ether_____ 2000 ml.
7–15, 70% ether—30% pet. ether___ 2000 ml. each.
16, 75% ether—25% pet. ether_____ 2000 ml.
17–24, 80% ether—20% pet. ether__ 2000 ml. each.
25, 80% ether—20% pet. ether_____ 1000 ml.

After evaporation of the solvent, fractions 14–25 gave a total of 4.0 g. of gummy solid. This solid was rechromatographed using 500 g. of silica gel in a 5 cm. diameter column:

Fraction:

1, 50% ether—50% pet. ether_____ 4000 ml.
2, 60% ether—40% pet. ether_____ 3000 ml.
3–22, 65% ether—35% pet. ether___ 1000 ml. each.
23–33, 70% ether—30% pet. ether__ 1000 ml. each.

After removal of the solvent, fractions 19, 28, 29 and 30 all contained crystalline material with some oil. These fractions were each washed with about 5 ml. of ether and a second time with about 2 ml. of ether. The total solid from these fractions was combined with the solid residue of fractions 20–27 inclusive. The total solid was recrystallized from an acetone-ether mixture to give 1.51 g. of 21-acetoxy-$\Delta^{1,4}$-pregnadiene-3,20-dione.

*Example 2*

A solution of 20.0 g. (0.0636 mole) of progesterone in 100 ml. of acetic acid was poured into a suspension of 102 g. (0.195 mole) of 84.5% lead tetraacetate in 1100 ml. of acetic acid at 45° C. The lead tetraacetate had previously been in solution at 65° C. but had partially precipitated upon cooling to 45° C. The mixture was then heated at 86–87° C. for 67 hours. After cooling, the mixture was poured into four liters of water and extracted twice with ether. The ether extracts were washed six times with water, twice with 8% sodium bicarbonate solution, and again twice with water, and the ether solution was dried over anhydrous sodium sulfate. The volume of the ether solution was regulated to 1000 ml., 1000 ml. of low-boiling petroleum ether (Skellysolve A)

was added, and the resulting solution was passed through an 8 cm. diameter column packed with 1000 g. of silica gel of less than 200 mesh. The column was eluted as follows using ether-petroleum ether mixtures of gradually increasing ether content as follows:

Fraction:
1, 50% ether—50% pet. ether_____ 8000 ml.
2, 50% ether—50% pet. ether_____ 4000 ml.
3, 60% ether—40% pet. ether_____ 2000 ml.
4, 70% ether—30% pet. ether_____ 6000 ml.
5–16, 70% ether—30% pet. ether___ 2000 ml. each.
17–25, 80% ether—20% pet. ether__ 2000 ml. each.

The total residue of gummy solid (3.4 g.) obtained by evaporation of the solvent from fractions 14–24, inclusive, was rechromatographed using 500 ml. of silica gel in a 5 cm. diameter column:

Fraction:
1, 50% ether—50% pet. ether_____ 4000 ml.
2, 60% ether—40% pet. ether_____ 3000 ml.
3, 65% ether—35% pet. ether_____ 1000 ml.
4–37, 65% ether—35% pet. ether___ 1000 ml. each.

The residues from fractions 19, 20 and 27–33, inclusive, were triturated with small amounts of ether to remove oily material, and the remaining solid was combined with the solid residues from fractions 21–26, inclusive. The total solid was then recrystallized from an acetone-ether mixture to give 1.61 g. of 21-acetoxy-$\Delta^{1,4}$-pregnadiene-3,20-dione.

*Example 3*

A solution of 50.0 g. (0.159 mole) of progesterone in 180 ml. of acetic acid at about 60° C. was poured into a solution of 170 g. (0.324 mole) of 84.5% lead tetraacetate in 1800 ml. of acetic acid at 70° C. The temperature of the mixture was 67–68° C. and this was heated for about five hours at 87–90° C. The reaction mixture was then concentrated at 60° C. using a water pump. After two hours most of the acetic acid had evaporated, and the residue was diluted with one liter of water and extracted twice with ether. The ether extracts were washed four times with water, twice with 8% sodium bicarbonate solution and again once with water. The ether solution was dried over anhydrous calcium carbonate and then over anhydrous calcium sulfate. The ether solution was then regulated in volume to one liter, diluted with an equal volume of low-boiling petroleum ether (Skellysolve A), and the solution was passed through an 8.5 cm. diameter column packed with 1.3 kg. of 100–200 mesh silica gel. The column was eluted with ether-petroleum ether mixtures, containing increasing proportions of ether as follows:

Fraction:
1–5, 50% ether—50% pet. ether_____ 4 liters each.
6–29, 60% ether—40% pet. ether_____ 4 liters each.

The residues of gummy solid obtained from evaporation of the solvent from fractions 19–28, inclusive, were triturated with ether, and the resulting total solid was combined with the material obtained from three similar experiments and recrystallized from an acetone-ether mixture to give 14.0 g. of 21-acetoxy-$\Delta^{1,4}$-pregnadiene-3,20-dione. Further recrystallization of this product from acetone-ether gave a sample of 21-acetoxy-$\Delta^{1,4}$-pregnadiene-3,20-dione melting at 202.6–204.0° C. (corr.).

*Analysis.*—Calcd. for $C_{23}H_{30}O_4$: C, 74.55; H, 8.16. Found: C, 74.40; H, 8.25.

Another sample of 21-acetoxy-$\Delta^{1,4}$-pregnadiene-3,20-dione melting at 205.8–207° C. had an optical rotation $[\alpha]_D^{25°} = +125.6°$ (1% in ethyl alcohol).

*Example 4*

A solution of 1.00 g. of potassium bicarbonate in 15 ml. of water was added to a solution of 1.00 g. of 21-acetoxy-$\Delta^{1,4}$-pregnadiene-3,20-dione in 40 ml. of hot methanol, and the mixture was refluxed for two hours. The mixture was then concentrated in vacuo on a steam bath, the residue was extracted three times with ether, and the ether solution was dried over anhydrous potassium carbonate and then concentrated. The residue was dissolved in ether, the solution diluted with an equal volume of low boiling petroleum ether (Skellysolve A), and the solution was passed through 2.0 cm. diameter column packed with 60 g. of 100–200 mesh silica gel. The column was eluted with ether-petroleum ether mixtures, containing increasing proportions of ether as follows:

Fraction:
1–2, 50% ether—50% pet. ether_____ 500 ml. each.
3–7, 60% ether—40% pet. ether_____ 500 ml. each.
8–9, 70% ether—30% pet. ether_____ 500 ml. each.
10–12, 80% ether—20% pet. ether___ 500 ml. each.
13–14, 90% ether—10% pet. ether___ 500 ml. each.
15, 100% ether_____ 500 ml.

The solid residue obtained by evaporation of the first 170 ml. of fraction 11 was recrystallized by dissolving it in 200 ml. of ether, filtering the solution and evaporating it to approximately 40 ml. There was thus obtained 223 mg. of $\Delta^{1,4}$-pregnadiene-3,20-dion-21-ol melting at 186–189° C.; optical rotation $[\alpha]_D^{25°} = +129°$ (1% in ethyl alcohol).

*Analysis.*—Calcd. for $C_{21}H_{28}O_3$: C, 76.80; H, 8.59. Found: C, 76.53; H, 8.61.

$\Delta^{1,4}$-pregnadiene-3,20-dion-21-ol can be esterified to produce a 21-acyloxy-$\Delta^{1,4}$-pregnadiene-3,20-dione by heating with a carboxylic acid halide or carboxylic acid anhydride in the presence of pyridine. In this manner such esters as 21-propionoxy-$\Delta^{1,4}$-pregnadiene-3,20-dione, 21-butyroxy-$\Delta^{1,4}$-pregnadiene-3,20-dione, 21-benzoyloxy-$\Delta^{1,4}$-pregnadiene-3,20-dione and 21-methylthioacetoxy-$\Delta^{1,4}$-pregnadiene-3,20-dione can be obtained.

I claim:

1. A compound selected from the group consisting of $\Delta^{1,4}$-pregnadiene-3,20-dion-21-ol and lower-alkanoic acid esters thereof.

2. $\Delta^{1,4}$-pregnadiene-3,20-dion-21-ol having the formula

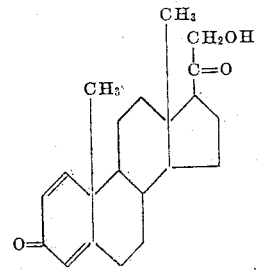

3. 21-acetoxy-$\Delta^{1,4}$-pregnadiene-3,20-dione having the formula

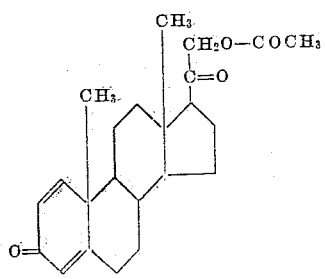

4. The process which comprises heating progesterone with from two to four moles of lead tetraacetate in acetic acid solution at a temperature between about 70° C. and 150° C.

5. The process which comprises heating progesterone with from two to four moles of lead tetraacetate in acetic acid solution at a temperature between about 70° C. and 150° C. and chromatographically separating the 21-acetoxy-$\Delta^{1,4}$-pregnadiene-3,20-dione thus formed.

6. The process which comprises heating progesterone with from two to four moles of lead tetraacetate in acetic acid solution at a temperature between about 70° C. and 150° C. and chromatographically separating the 21-acetoxy-$\Delta^{1,4}$-pregnediene-3,20-dione thus formed on a column of silica gel.

References Cited in the file of this patent

UNITED STATES PATENTS 2,340,388    Inhoffen _____ Feb. 1, 1944

FOREIGN PATENTS 234,536    Switzerland _____ Feb. 1, 1945

OTHER REFERENCES

Fieser et al.: Natural Products Related to Phenanthrene, 3rd ed., pp. 406–7, 444 (1949).